(12) United States Patent
Mansour et al.

(10) Patent No.: US 8,837,271 B1
(45) Date of Patent: Sep. 16, 2014

(54) METHOD AND SYSTEM FOR SHARING A DOWNLINK RESOURCE BLOCK AMONG MULTIPLE USERS

(71) Applicant: Sprint Spectrum L.P., Overland Park, KS (US)

(72) Inventors: Nagi A. Mansour, Arlington, VA (US); Alexandr Shusterman, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 131 days.

(21) Appl. No.: 13/644,592

(22) Filed: Oct. 4, 2012

(51) Int. Cl.
*H04J 11/00* (2006.01)

(52) U.S. Cl.
USPC ......... 370/208; 370/210; 370/328; 370/329; 370/252

(58) Field of Classification Search
None
See application file for complete search history.

(56) References Cited

U.S. PATENT DOCUMENTS

| | | | | |
|---|---|---|---|---|
| 8,254,329 | B2* | 8/2012 | Ko et al. | 370/330 |
| 2006/0067421 | A1* | 3/2006 | Walton et al. | 375/267 |
| 2007/0223364 | A1* | 9/2007 | Terabe et al. | 370/208 |
| 2010/0208608 | A1* | 8/2010 | Wang | 370/252 |
| 2010/0246376 | A1 | 9/2010 | Nam et al. | |
| 2011/0038344 | A1* | 2/2011 | Chmiel et al. | 370/330 |
| 2011/0081932 | A1 | 4/2011 | Astely et al. | |
| 2011/0228735 | A1 | 9/2011 | Lee et al. | |
| 2012/0002746 | A1 | 1/2012 | Pham | |
| 2013/0070580 | A1* | 3/2013 | Wang et al. | 370/209 |
| 2013/0083764 | A1 | 4/2013 | Kim et al. | |
| 2013/0195034 | A1* | 8/2013 | Noh et al. | 370/329 |

OTHER PUBLICATIONS

Jaimin Patel, "LTE MIMO Concepts," posted to www.4gwirelessjobs.com on Jun. 27, 2010.
"Uplink Control Channel Format 1," accessed on May 17, 2012 from www.steepestascent.com/content/mediaassets/html/LTE/help/PUCCHFormat1.html.
Rana A. Abdelaal et al., "Resource Allocation Strategies Based on the Signal-to-Leakage-plus-Noise Ratio in LTE-A CoMP Systems," Proceedings of IEEE Wireless Communications and Networking Conference (WCNC), 2012.
Hongyan, "Physical Hybrid-ARQ Indicator Channel," http://lteuniversity.com/get_trained/expert_opinion1/b/hongyanlei/archive/2011/07/08/physical-hybrid-arq-indicator-channel-phich.aspx, Jul. 8, 2011.
Min Lee and Seong Keun Oh, "On Resource Block Sharing in 3GPP-LTE System," 17th Asia-Pacific Conference on Communications (APCC), IEEE, 2011.

* cited by examiner

*Primary Examiner* — Duc C Ho

(57) ABSTRACT

A downlink resource block in an orthogonal frequency division multiplexing (OFDM) communication system can be shared among multiple wireless communication devices (WCDs) by assigning one or more orthogonal codes to each WCD. To transmit data to the WCDs using the downlink resource block, a base station may receive a data stream that includes respective data for each of the WCDs and encode each WCD's respective data with a respective orthogonal code assigned to that WCD to generate an encoded data stream. An OFDM transmitter in the base station may receive the encoded data stream and transmit the encoded data in the form of OFDM symbols in the downlink resource block. A WCD can receive the downlink resource block, recover the encoded data from the OFDM symbols, and use the one or more orthogonal codes assigned to it to recover the data for that WCD from the encoded data.

18 Claims, 9 Drawing Sheets

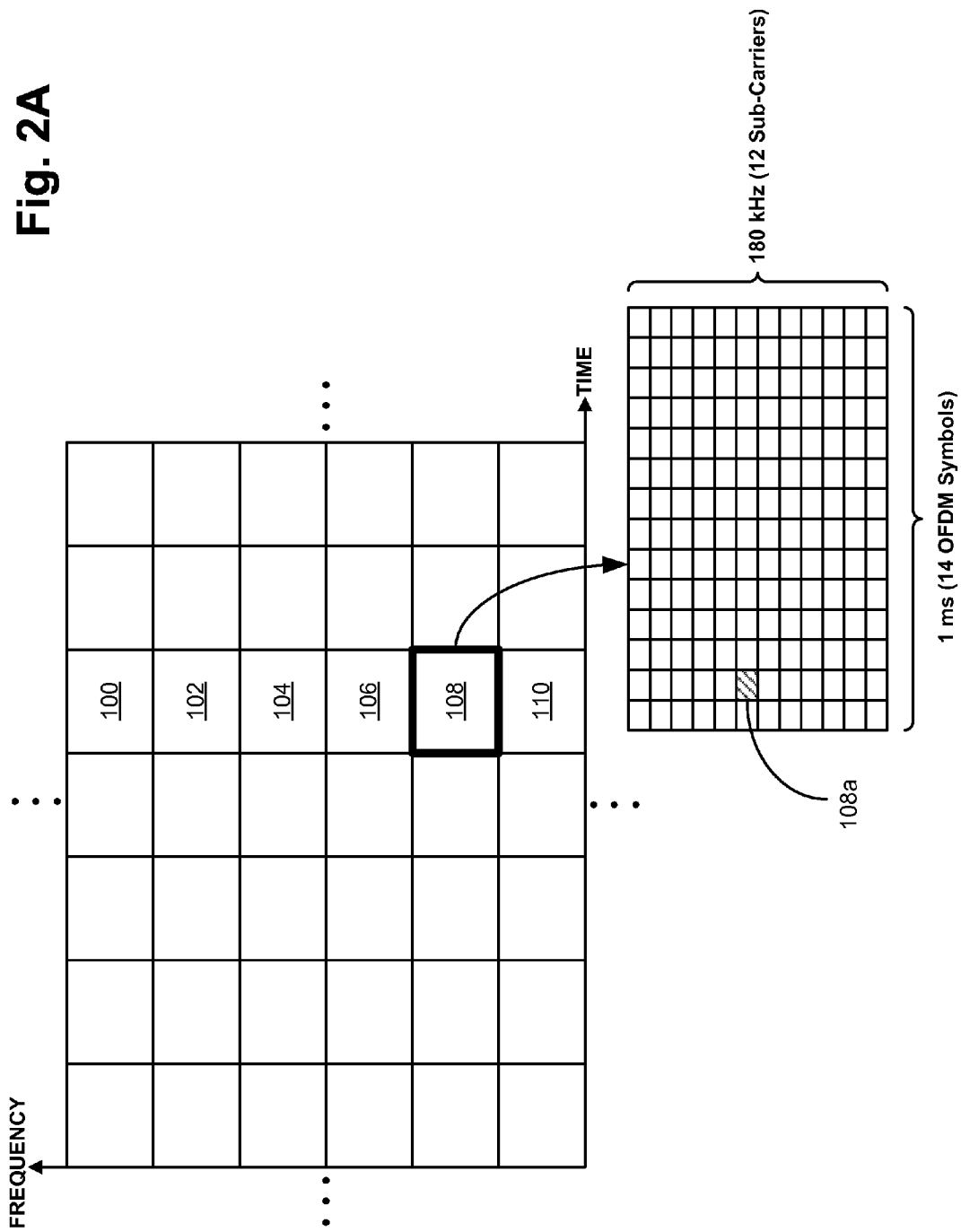

US 8,837,271 B1

METHOD AND SYSTEM FOR SHARING A DOWNLINK RESOURCE BLOCK AMONG MULTIPLE USERS

BACKGROUND

In a wireless communication system, a base station may transmit downlink data to one or more wireless communication devices (WCDs) that are operating in a wireless coverage area provided by the base station. The wireless coverage area could be, for example, a cell or a sector. The base station may also receive uplink data from one or more WCDs operating in the wireless coverage area.

Some of the downlink data transmitted by the base station may be transmitted in a downlink channel that can be shared among multiple WCDs. For example, the Long Term Evolution (LTE) of the Universal Mobile Telecommunications System (UMTS) defines a Physical Downlink Shared Channel (PDSCH) as the primary downlink channel for transmitting user data to WCDs. In addition, LTE defines downlink control channels that carry various types of control signaling. The downlink control channels include a Physical Control Format Indicator Channel (PCFICH), a Physical Downlink Control Channel (PDCCH), and a Physical Hybrid ARQ Indicator Channel (PHICH).

In the LTE approach, downlink resources are mapped in the time domain and in the frequency domain. In the time domain, LTE defines 10 millisecond (ms) frames, 1 ms sub-frames and 0.5 ms slots. Thus, each frame has 10 sub-frames, and each sub-frame has 2 slots. In the frequency domain, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), to form one OFDM symbol.

LTE further defines a particular grouping of time-domain and frequency-domain resources as a downlink resource block. In the time domain, each downlink resource block has a duration corresponding to one sub-frame (1 ms). In the frequency domain, each downlink resource block consists of a group of 12 sub-carriers that are used together to form OFDM symbols. Typically, the 1 ms duration of a downlink resource block accommodates 14 OFDM symbols. Depending on the bandwidth of the system, multiple downlink resource blocks can be transmitted in each 1 ms sub-frame. For example, a system with a 5 MHz bandwidth may be able to transmit 25 downlink resource blocks in each 1 ms sub-frame.

The smallest unit of downlink resources is the resource element. Each resource element corresponds to one sub-carrier and one OFDM symbol. Thus, a resource block that consists of 12 sub-carriers and 14 OFDM symbols has 168 resource elements. Within a resource block, different resource elements can have different functions. In particular, a certain number of the resource elements (e.g., 8 resource elements) may be reserved for reference signals used for channel estimation. In addition, a certain number of the resource elements (e.g., the resource elements in the first one to four OFDM symbols) may be reserved for control signals in the PCFICH, PDCCH, and PHICH channels. The remaining resource elements in a downlink resource block can be used for user data in the PDSCH channel.

The PDSCH channel can be shared among WCDs by allocating one or more downlink resource blocks to each WCD. Conventionally, the user data (PDSCH channel) in a downlink resource block that is allocated to a particular WCD is for only that particular WCD. Thus, while the PDSCH channel can be shared by multiple WCDs, the user data in a downlink resource block might be for only one WCD.

OVERVIEW

In one aspect, a method is provided. The method involves allocating a downlink resource block to a plurality of wireless communication devices (WCDs). The downlink resource block comprises a plurality of sub-carriers and corresponds to a specified time period that has a duration that accommodates transmission of multiple symbols. The method also involves selecting a plurality of orthogonal codes for the downlink resource block and assigning each WCD in the plurality of WCDs a respective set of one or more orthogonal codes from the selected plurality of orthogonal codes. The method further involves receiving a data stream that comprises respective data for each of the WCDs and generating an encoded data stream from the data stream, wherein generating the encoded data stream from the data stream comprises encoding each WCD's respective data in the data stream using a respective orthogonal code assigned to that WCD. Still further, the method involves generating output symbols from the encoded data stream and transmitting, by a transmitter, the output symbols in the downlink resource block.

In another aspect, a method for a WCD is provided. The WCD receives an indication of a downlink resource block being allocated to the WCD. The downlink resource block comprises a plurality of sub-carriers and corresponds to a specified time period. The WCD also receives an indication of at least one orthogonal code being assigned to the WCD. The WCD receives a plurality of OFDM symbols in the downlink resource block. The WCD recovers encoded data from the OFDM symbols, wherein the encoded data comprises data for the WCD and data for at least one other WCD. The WCD uses the at least one orthogonal code to recover the data for the WCD from the encoded data.

In yet another aspect, a base station is provided. The base station comprises a transmitter for transmitting downlink data to WCDs operating in a wireless coverage area of the base station, a buffer for accumulating data for subsequent transmission by the transmitter, and a controller. The controller is configured to: (i) identify a downlink resource block as being available for allocation; (ii) make a determination that the downlink resource block would have sufficient bandwidth to transmit particular data in the buffer after, wherein the particular data is for a particular plurality of WCDs operating in the wireless coverage area; and (iii) in response to the determination, allocate the downlink resource block to the particular plurality of WCDs and assign each WCD in the particular plurality of WCDs a respective set of one or more orthogonal codes.

BRIEF DESCRIPTION OF THE DRAWINGS

FIG. 2A is a conceptual illustration of a division of a shared downlink channel into downlink resource blocks, in accordance with an example embodiment.

DETAILED DESCRIPTION OF EXAMPLE EMBODIMENTS

1. Introduction

Figure 1:
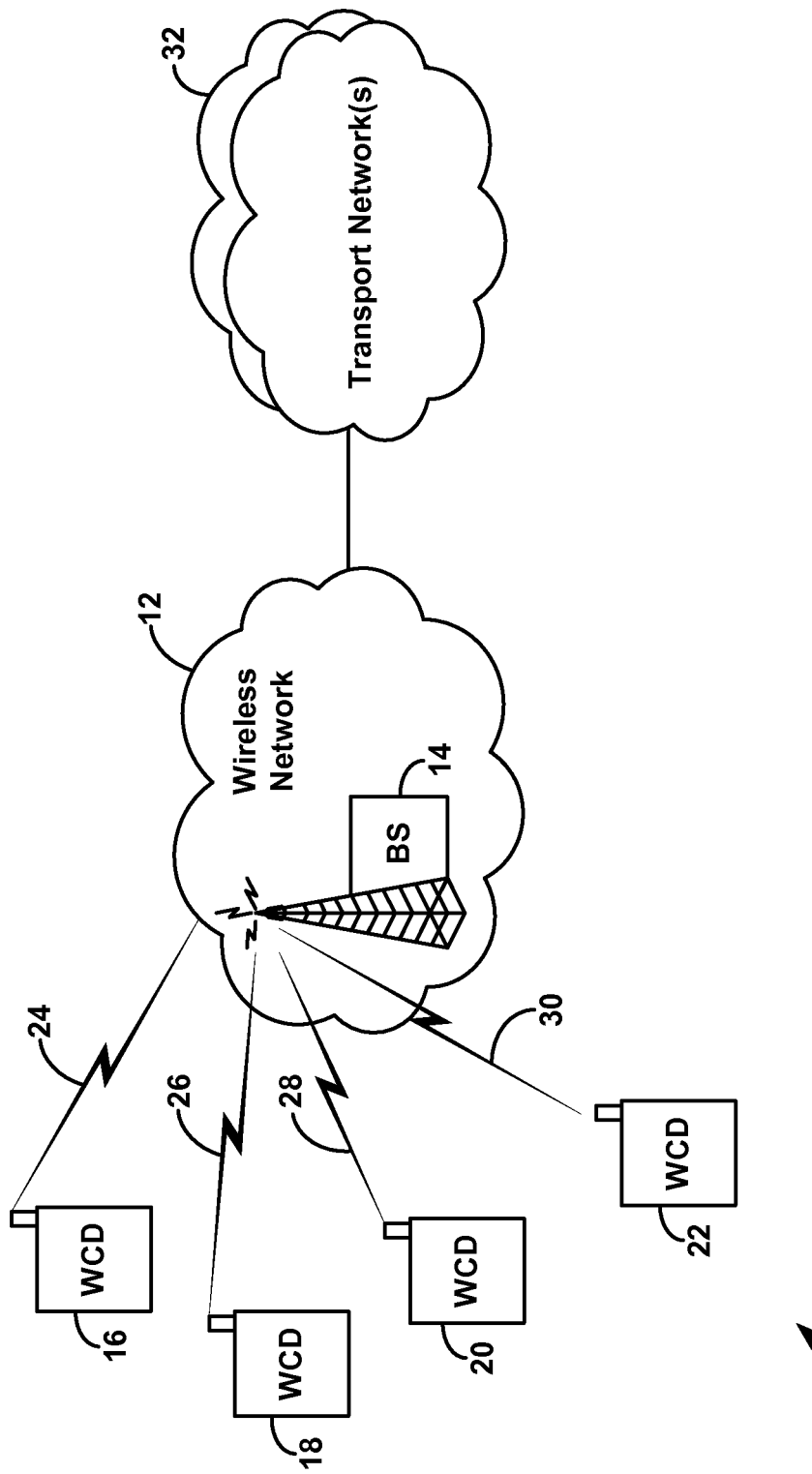
FIG. 1 is a block diagram of a communication system, in accordance with an example embodiment.

The inventors have recognized that the conventional approach of allocating a downlink resource block to only a single user can sometime lead to inefficiencies. For example, if a downlink resource block that is able to provide data at a relatively high data rate, such as 1 Mbits/second is allocated to a user for data that has a much lower data rate (e.g., voice data), then the user may have in effect been allocated more bandwidth than necessary. In order to provide more efficient use of downlink resources, the inventors propose methods and systems that enable a downlink resource block to be shared among multiple users. Further, when a downlink resource block is shared among multiple users, each user's data may be identified by a distinct code, such as an orthogonal code.

In an example embodiment, a downlink resource block in an orthogonal frequency division multiplexing (OFDM) communication system is allocated to multiple wireless communication devices (WCDs) and each WCD is assigned one or more orthogonal codes. To transmit data to the WCDs using the downlink resource block, a base station may receive a data stream that includes respective data for each of the WCDs and encode each WCD's respective data with a respective orthogonal code assigned to that WCD to generate an encoded data stream. An OFDM transmitter in the base station may receive the encoded data stream and transmit the encoded data in the form of OFDM symbols in the downlink resource block.

The orthogonal codes may also be used by each WCD to recover its respective data from the downlink resource block. For example, a particular WCD to which a resource block has been allocated can receive the OFDM symbols in the downlink resource block and recover the encoded data from the OFDM symbols. The encoded data includes data for that particular WCD as well as data for the one or more other WCDs to which the resource block has been allocated. The particular WCD can use the one or more orthogonal codes assigned to it to recover the data for the particular WCD from the encoded data. In this way, orthogonal codes can facilitate more efficient usage of downlink resources by enabling data for multiple WCDs to be included in the same downlink resource block.

The orthogonal codes that are used for a downlink resource block shared by multiple users could be any type of mutually orthogonal codes. Walsh codes are one class of such orthogonal codes. In general, a set of n orthogonal codes could be any set of n mutually orthogonal vectors in an n-dimensional space. The n orthogonal codes could then be shared by up to n users. In some cases, each user could be assigned only one orthogonal code from the set. In other cases, a user could be assigned more than one orthogonal code from the set. It is also possible that one or more of the orthogonal codes in the set might not be assigned to any user. For example, a set of four orthogonal codes might be selected for three users, with one of the orthogonal codes remaining unassigned.

The mutual orthogonality of the codes can be expressed in terms of the dot products between any two codes $C_i$ and $C_j$. Specifically, mutual orthogonality means the following:

$C_i \cdot C_j = 0$, if $i \neq j$; and $C_i \cdot C_j = k$, if $i = j$ (where $k$ is a non-zero constant). (1)

As a result of this mutual orthogonality, the data from n users can be expressed as a linear combination, L, as follows:

$L = U_1 C_1 + U_2 C_2 + \ldots + U_n C_n$ (2)

where U is the data for the ith user and $C_i$ is the orthogonal code assigned to the ith user.

The data for a particular user, p, can then be recovered from this linear combination by using $C_p$, the orthogonal code assigned to user p, as follows:

$U_p = (C_p \cdot L)/k$ (3)

Thus, when orthogonal codes are used to encode the data for multiple users, each user can use its respective orthogonal code to recover its respective data from the encoded data.

This approach can be used to encode and decode digital data. For example, if each user's data, $U_i$, is a block of data consisting of b bits, and each element of orthogonal code $C_i$ is also b bits, then the linear combination, L, that results from encoding the data from n users could be expressed as a sequence of nb bits.

In an OFDM communication system, the encoding of data using orthogonal codes may occur outside of the OFDM transmitter and the decoding of data may occur outside of the OFDM receiver. Thus, data may be encoded using orthogonal codes and then provided to an OFDM transmitter in encoded form. Similarly, the data output from an OFDM receiver could be encoded data that is subsequently decoded using one or more orthogonal codes. In this way, the use of orthogonal codes to share a downlink resource block among multiple users need not change the operations at the physical layer of an OFDM communication system. Put another way, orthogonal codes can be used in a manner that is transparent to the OFDM transmitter and OFDM receiver.

Described below are examples of how orthogonal codes may be used in a base station that includes an OFDM transmitter and a WCD that includes an OFDM receiver, so as to enable a downlink resource block to be shared among multiple WCDs.

2. Example Communication System

FIG. 1 is a block diagram of a communication system 10 in which example embodiments may be employed. Communication system 10 includes a wireless network 12 that includes one or more entities that can communicate over an air interface, as exemplified by base station (BS) 14. Wireless network 12 could also include one or more control entities, such as a base station controller (BSC) or radio network controller (RNC). Wireless network 12 could be, for example, a radio access network (RAN). BS 14 could be, for example, a base transceiver station, a wireless access point, an access node, a Node-B, or an eNodeB. Although FIG. 1 shows only one base station in wireless network 12, it is to be understood that wireless network 12 could include any number of base stations.

BS 14 radiates to define one or more wireless coverage areas within which BS 14 can wirelessly communicate with WCDs. The wireless coverage area defined by BS 14 could be a cell that generally surrounds BS 14. Alternatively, BS 14 may define multiple wireless coverage areas, such as sectors.

Each sector may be defined by multiple antennas in BS 14 so as to generally correspond to a range of azimuthal angles (e.g., 120°) about BS 14.

For purposes of illustration, BS 14 is shown as being in wireless communication with WCDs 16, 18, 20, 22 via respective air interfaces 24, 26, 28, and 30. WCDs 16-22 could be wireless telephones, wireless handheld or laptop computers, or other types of wireless communication devices. Although FIG. 1 shows BS 14 in wireless communication with four WCDs, it is to be understood that BS 14 could be in wireless communication with a greater or fewer number of WCDs. In addition, the number of WCDs in wireless communication with BS 14 can change over time, for example, as a result of one or more WCDs moving into or out of the wireless coverage area of BS 14 and/or as a result of one or more WCDs beginning or ending communication sessions.

Each of air interfaces 24-30 could include a respective uplink, with which a WCD can transmit data to BS 14, and a respective downlink, with which BS 14 can transmit data to a WCD. The communications over air interfaces 24-30 could conform to any wireless protocol now known or later developed. For purposes of illustration, the communications over air interfaces 24-30 will be described herein with respect to the LTE protocol.

Wireless network 12 may provide connectivity with one or more transport networks 32, which could include, for example, the public switched telephone network (PSTN) and/or the Internet or other packet-switched networks. With this arrangement, a WCD being served by BS 14 may engage in a communication session, via wireless network 12, with an endpoint connected to one of transport networks 32. The endpoint could be, for example, another WCD, a landline telephone, an email server, Web server, media server, or gaming server. The communication session could involve voice, text, images, video, data, or other media that is transferred from the WCD to the endpoint and/or from the endpoint to the WCD.

Thus, when a WCD, such as WCD 16, 18, 20, or 22, is involved in a communication session, the WCD may transmit data over an uplink channel to BS 14 and may receive data from BS 14 over a downlink channel. In some cases, the communication session could be one that involves a user of the WCD, such as a voice communication application or Web browsing application. In other cases, the communication session could involve a background task, such as periodically registering with wireless network 12.

In some implementations, BS 14 may transmit data to WCDs 16-22 over a shared downlink channel. The usage of the shared downlink channel may be controlled by BS 14 or by some other entity in wireless network 12. For example, the LTE protocol defines a Physical Downlink Shared Channel (PDSCH) that a base station can use to transmit data to multiple WCDs that are operating in its wireless coverage area. Portions of the PDSCH may be allocated to particular WCDs in the form of downlink resource blocks. FIG. 2A illustrates how the downlink resources in a given wireless coverage area may be divided in time and frequency domains into resource blocks. In the time domain, each resource block occupies a 1 ms sub-frame. By way of example, FIG. 2A shows resource blocks 100-110 for a particular sub-frame. In the frequency domain, each of resource blocks 100-110 occupies a respective portion of frequency bandwidth, typically 180 kHz in LTE implementations. Although FIG. 2A shows six resource blocks in each sub-frame, a wireless coverage area could have a greater number of resource blocks, as indicated by the dots above and below resource blocks 100-110.

FIG. 2A also includes a more detailed view of downlink resource block 108. This detailed view shows that the 180 kHz of frequency bandwidth corresponds to 12 sub-carriers of 15 kHz each, and also shows that the 1 ms sub-frame corresponds to the duration of 14 OFDM symbols (the number of OFDM symbols in a downlink resource block can vary). Each OFDM symbol spans the 12 sub-carriers and includes a respective sub-carrier symbol on each sub-carrier. Thus, a downlink resource block may be described as a set of resource elements, with each resource element corresponding to a sub-carrier symbol that is carried on a particular sub-carrier for the duration of one OFDM symbol. The detailed view of downlink resource block 108 in FIG. 2A shows the division of the resource block into multiple resource elements, such as resource element 108a.

Each sub-carrier symbol or resource element represents a data block of a certain number of bits, depending on the type of modulation that is used. For example, if Quadrature Phase Shift Keying (QPSK) is used for the sub-carrier symbols, then each sub-carrier symbol represents two bits of data. If Quadrature Amplitude Modulation (QAM) is used for the sub-carrier symbols, then each sub-carrier symbol represents a greater number of bits: four bits per symbol for 16 QAM and six bits per symbol for 64 QAM.

Figure 2B:
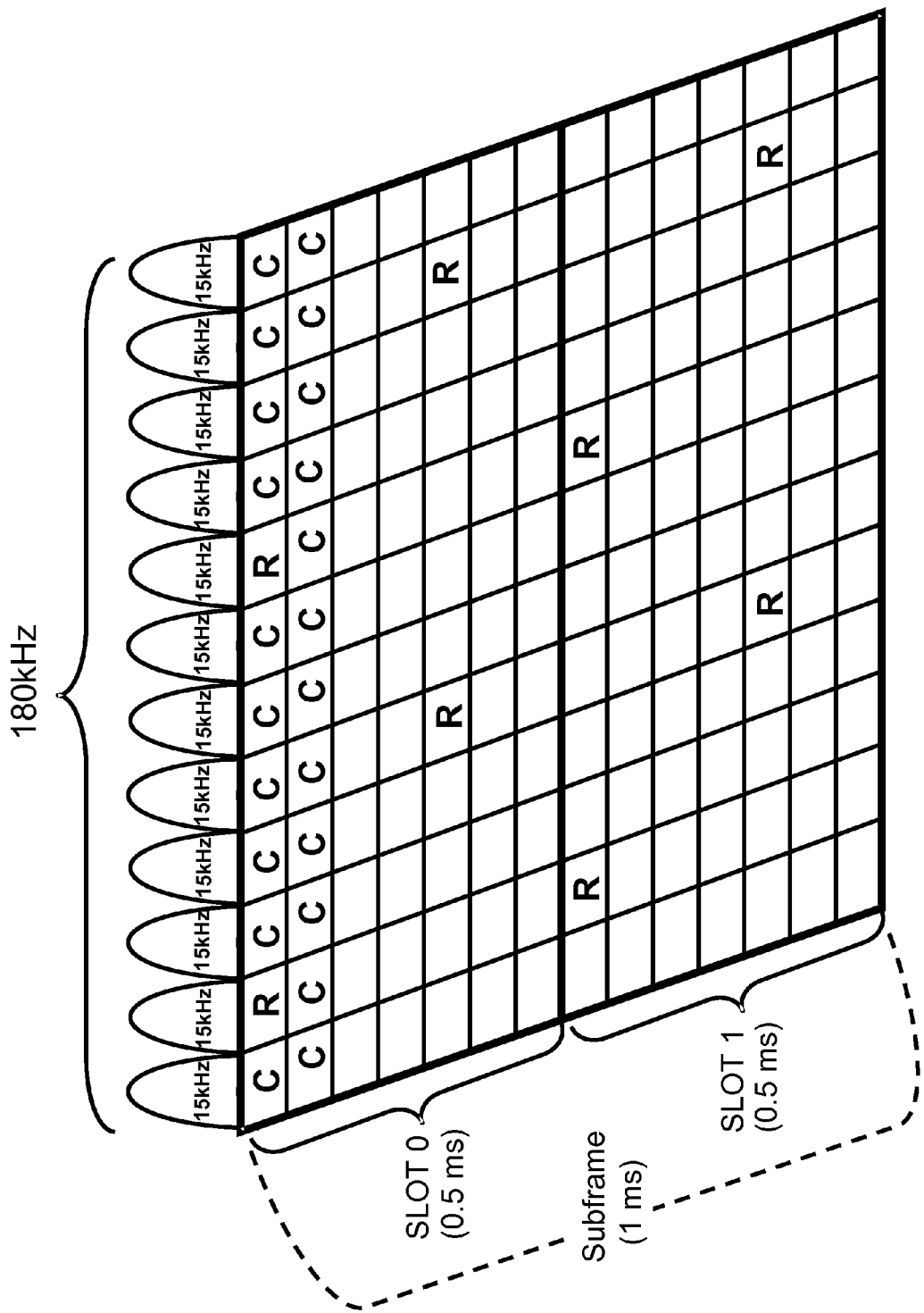
FIG. 2B is a conceptual illustration of a downlink resource block, in accordance with an example embodiment.

Different resource elements in a downlink resource block may be used for different purposes. FIG. 2B illustrates different functions among the 168 resource elements in an example downlink resource block for a one antenna port system. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (PCFICH, PDCCH, and PHICH channels). The other 138 resource elements that are unlabeled can be used to transmit user data (PDSCH channel). It is to be understood that FIG. 2B illustrates only one possible configuration. In other configurations, a downlink resource block could have a greater or fewer number of resource blocks available to transmit user data.

In a conventional LTE implementation, a downlink resource block is allocated to a particular WCD. For example, resource blocks 100 and 102 might be allocated to WCD 16, resource blocks 104-108 might be allocated to WCD 18, and resource block 110 might be allocated to WCD 20. However, in the examples described herein, a downlink resource block could be allocated to a plurality of WCDs. Thus, a downlink resource block (e.g., resource block 108), could be allocated to two WCDs (e.g., WCDs 16 and 18), to four WCDs (e.g., WCDs 16-22), or to an even greater number of WCDs. Further, through the use of orthogonal codes, the bandwidth of a downlink resource block can be shared among the WCDs to which it is allocated. Moreover, the bandwidth sharing would not necessarily involve reserving particular sub-carriers, particular OFDM symbols, or particular resource elements to particular WCDs. Instead, each resource element that carries user data in the downlink resource block could be shared by the plurality of WCDs to which the resource block has been allocated.

The allocation of downlink resource blocks to WCDs could be made by BS 14 or by some other entity in wireless network 12. The determination of whether to allocate a downlink resource block to a particular WCD, or to a particular plurality of WCDs, could be made based on various factors. Such factors could include, for example, the amount of data that each WCD is to receive, the type of data that each WCD is to receive (e.g., whether the data is real-time data or non-realtime data), and the radio frequency (RF) conditions at each WCD. BS 14 or some other entity in wireless network 12 may determine the RF conditions at the WCDs based on reports transmitted by the WCDs. For example, in the LTE approach, each WCD can transmit a Channel Quality Indicator (CQI) that indicates the downlink data rate that the WCD can support, given the signal-to-interference plus noise ratio (SINR) at the WCD's location and the characteristics of the WCD's receiver. Thus, a CQI report from a WCD is indicative of the RF conditions at the WCD. Moreover, the CQI reported by a WCD can be used to select a modulation rate (e.g., QPSK, 16QAM, or 64QAM) for the OFDM symbols in a downlink resource block, as well as the level of error-correction coding that is provided. In this way, the CQI reports can be used to select a particular data transmission bandwidth for a downlink resource block.

If the data transmission bandwidth of the downlink resource block allocated to a WCD is greater than the data rate that is needed to transmit the WCD's data, then the downlink resource block could also be allocated to one or more additional WCDs. For example, a downlink resource block might be able to transmit data at a rate of 1 Mbits/second. However, if the data being transmitted to the WCD is voice data with a data rate on the order of 10 kbits/second, then the downlink resource block could be also used to transmit data to other WCDs. For example, the downlink resource block could be used transmit multiple streams of voice data to multiple WCDs.

In the LTE approach, the allocation of downlink resource blocks to WCDs is communicated to the WCDs by the base station transmitting control signaling over the Physical Downlink Control Channel (PDCCH). The control signaling regarding allocation of a particular resource block could occur at the start of a sub-frame that includes that particular resource block. In subsequent sub-frames, the allocation of downlink resource blocks to the WCDs could be different. For example, a WCD might share downlink resource blocks with one or more other WCDs in one sub-frame but not in the next sub-frame. Thus, BS 14 may periodically evaluate, and potentially adjust, the allocation of downlink resource blocks to WCDs, and BS 14 may perform this evaluation every sub-frame.

3. Example Base Station and Base Station Functions

Figure 3:
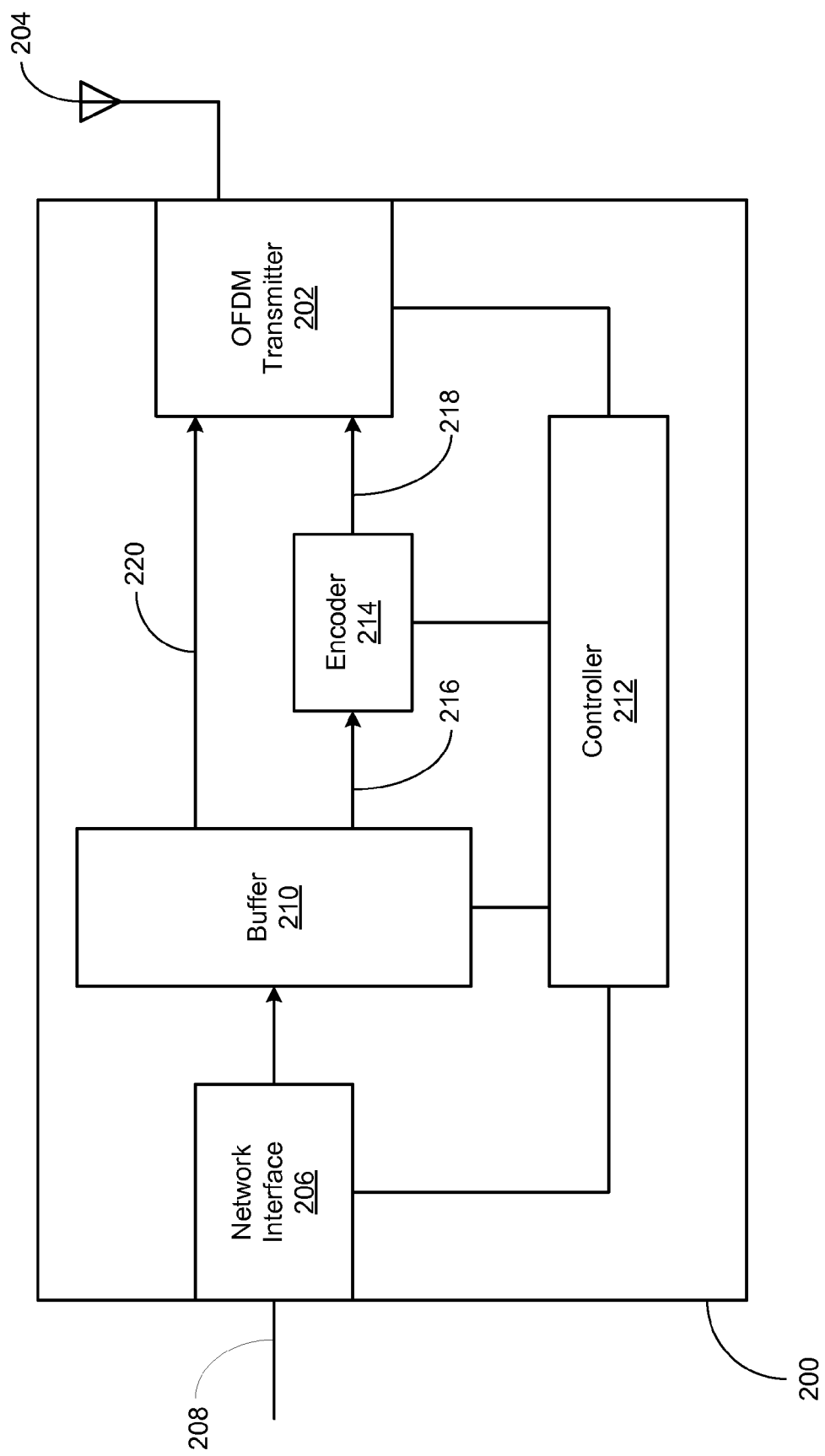
FIG. 3 is a functional block diagram of a base station, in accordance with an example embodiment.

FIG. 3 is a functional block diagram of an example base station 200. Base station 200 could, for example, be part of a communication system as shown in FIG. 1. Thus, base station 200 could correspond to base station 14. For purposes of illustration, base station 200 will be described as using OFDM and downlink resource blocks as shown in FIGS. 2A and 2B and described above. It is to be understood, however, that other types of air interfaces could be used.

As shown in FIG. 3, base station 200 includes an OFDM transmitter 202 for transmitting downlink data to WCDs operating in a wireless coverage of base station 200. The transmissions could occur through one or more antennas (either directional or omni-directional), as exemplified by antenna 204. As described in more detail below, OFDM transmitter 202 is configured to receive a data stream, generate OFDM symbols from the data stream, and transmit the OFDM symbols in one or more resource blocks. In addition to OFDM transmitter 202, base station may include an OFDM receiver (not shown) for receiving uplink data transmitted by WCDs operating in its wireless coverage area.

Base station 200 includes a network interface 206 for receiving data over a backhaul connection 208 that connects base station 200 to one or more entities in a wireless network. The backhaul connection 208 can include wireless and/or wireline communication links. The data that base station 200 receives via backhaul connection 208 and network interface 206 can include data for one or more WCDs operating in its wireless coverage area. Base station 200 may accumulate such data, for example, in a buffer 210, for subsequent transmission to WCDs.

A controller 212 in base station 200 may control the transmission of data in buffer 210 to WCDs using OFDM transmitter 202. For example, controller 212 may allocate downlink resource blocks to WCDs and schedule the transmission of data by OFDM transmitter 202 based on the allocated resource blocks. Controller 212 could be implemented using hardware, software, and/or firmware. For example controller 212 could include one or more processors and a non-transitory computer readable medium (e.g., volatile and/or non-volatile memory) that stores executable instructions. The executable instructions, when executed by the one or more processors, may cause controller 212 to perform any of the base station functions described herein.

When controller 212 allocates a downlink resource block to a plurality of WCDs, controller 212 may also assign a set of one or more orthogonal codes to each WCD in the plurality of WCDs. In addition, base station 200 may include an encoder 214 that encodes the data for a particular WCD using an orthogonal code assigned to that particular WCD, so as to generate an encoded data stream. Thus, encoder 214 may receive a data stream 216 from buffer 210 that includes data for multiple WCDs, encode each WCD's data using an orthogonal code assigned to that WCD, and output an encoded data stream 218 to OFDM transmitter 202. Encoder 214 could be implemented using hardware, software, and/or firmware. In some implementations, encoder 214 could be part of controller 212.

In some cases, a WCD might be assigned multiple orthogonal codes. This approach may be used, for example, when a WCD has reported relatively poor RF conditions. To improve the WCD's reception of data, multiple instances of the same data may be transmitted to the WCD, with each instance being encoded using a distinct orthogonal code. Thus, when a WCD is assigned a plurality of orthogonal codes, encoder 214 may generate multiple instances of the WCD's data and encode each instance with a particular orthogonal code in the plurality.

In some embodiments, data may be encoded with orthogonal codes only for a downlink resource block that has been allocated to multiple WCDs. The data for a downlink resource block that has been allocated to a single WCD would not be encoded. As a result, OFDM transmitter 202 could receive both the encoded data stream 218 from encoder 214 (e.g., data for a resource block allocated to multiple WCDs) and a data stream 220 from buffer 210 in which the data has not been encoded using orthogonal codes (e.g., data for a resource block allocated to a single WCD). OFDM transmitter 202 could, however, transmit the data in the same way, regardless of whether or not the data has been encoded using orthogonal codes. In other words, the use of orthogonal codes can be transparent to OFDM transmitter 202.

Figure 4:
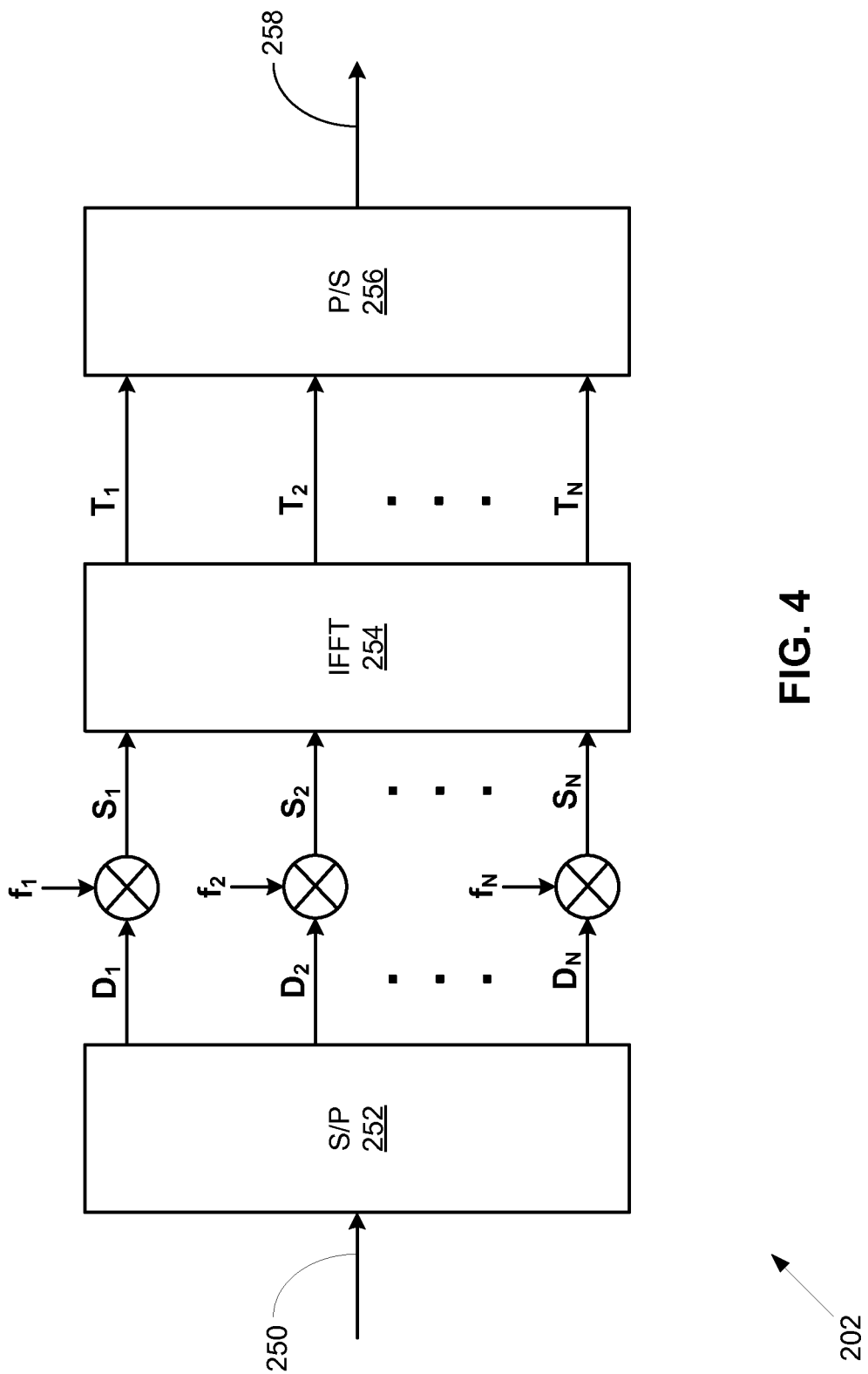
FIG. 4 is a functional block diagram of an OFDM transmitter, in accordance with an example embodiment.

FIG. 4 is a functional block diagram of OFDM transmitter 202 that illustrates how a data stream 250 may be processed for transmission, according to an example embodiment. Data stream 250 could be an encoded data stream, such as encoded data stream 218, in which the data has been encoded using orthogonal codes. Alternatively, data stream 250 could be a data stream, such as data stream 220, in which the data has not been encoded using orthogonal codes.

In OFDM transmitter 202, data stream 250 is received by a Serial-to-Parallel (S/P) converter 252, where the serial data is divided into N parallel streams for modulation onto N sub-carriers. In FIG. 4, the parallel streams of data are identified as $D_1$ through $D_N$, with only $D_1$, $D_2$, and $D_N$ being shown for simplicity. In each of the parallel data streams, blocks of data are used to modulate a particular sub-carrier. The number of bits in each data block will depend on the type of modulation that is used (e.g., 2-bit blocks for QPSK, 4-bit blocks for 16QAM, and 6-bbit blocks for 64QAM). In this example, the N sub-carriers are identified by their frequencies: $f_1$ through $f_N$. Thus, data from $D_1$ is used to modulate sub-carrier $f_1$, data from $D_2$ is used to modulate sub-carrier $f_2$, and so forth. Modulating the sub-carriers in this way results in the formation of a respective symbol on each sub-carrier. Thus, sub-carrier $f_1$ has a sub-carrier symbol $S_1$, sub-carrier $f_2$ has a sub-carrier symbol $S_2$, and so forth.

An OFDM symbol is formed from the sub-carrier symbols $S_1$ through $S_N$ by passing the sub-carrier symbols through an Inverse Fast Fourier Transform (IFFT) module 254, which generates a set of N time-domain samples, $T_1$ through $T_N$, and then using a Parallel-to-Serial (P/S) converter 256 to combine the time-domain samples into one OFDM symbol. Thus, whereas each of symbols $S_1$ through $S_N$ is carried on an individual sub-carrier, the resulting OFDM symbol spans the N sub-carriers. The OFDM symbol can also include a cyclic prefix to reduce inter-symbol interference that may be caused by multipath propagation. To form the cyclic prefix, the last P of the time-domain samples $T_1$ though $T_N$ are duplicated and provided to P/S 256 so that the duplicate time-domain samples are added at beginning of the OFDM symbol. In this way, OFDM transmitter 202 generates a sequence of OFDM symbols from data stream 250. The sequence of OFDM symbols is provided as an output 258 from OFDM transmitter 202 that can be transmitted through antenna 204.

Figure 5:
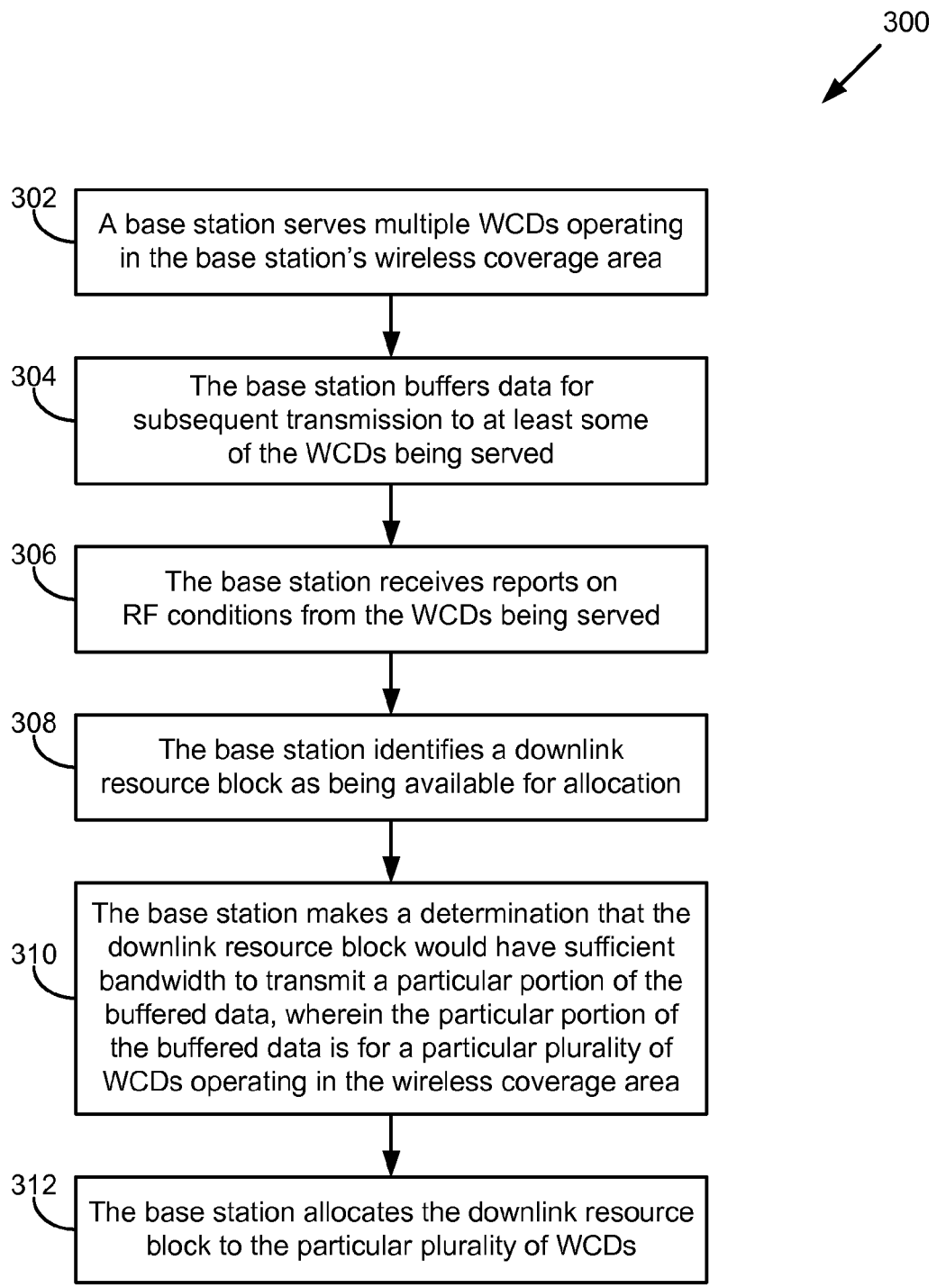
FIG. 5 is a flowchart of a method that may be performed by a base station, in accordance with an example embodiment.
Figure 6:
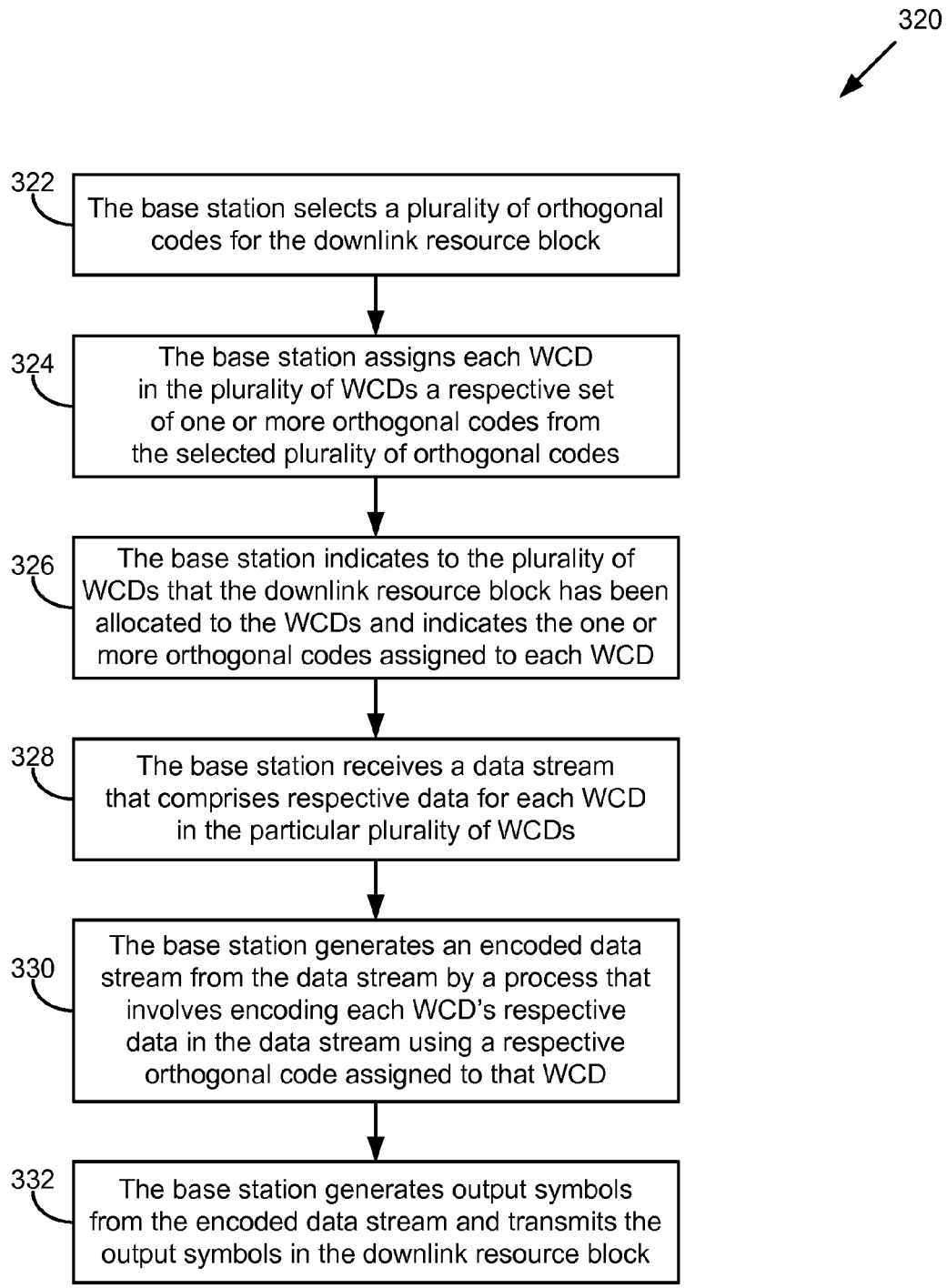
FIG. 6 is a flowchart of another method that may be performed by a base station, in accordance with an example embodiment.

FIGS. 5 and 6 are flowcharts illustrating example methods that may be performed by a base station, such as base station 200. FIG. 5 illustrates an example method 300 in which a base station allocates a downlink resource block to a particular plurality of WCDs. FIG. 6 illustrates an example method 320 in which a downlink resource block that has been allocated to a plurality of WCDs (for example, in accordance with method 300) is used to transmit data to the WCDs.

In method 300, a base station serves multiple WCDs operating in the base station's wireless coverage area, as indicated by block 302. As one particular example, a base station, such as base station 14, might serve four WCDs, such as WCDs 16-22. In other examples, the base station might server a greater or fewer number of WCDs.

The base station may also buffer data for subsequent transmission to at least some of the WCDs being served, as indicated by block 304. For example, base station 200 may accumulate data in buffer 210 for subsequent transmission by OFDM transmitter 202 to any of the WCDs being served by base station 200. Thus, with reference to FIG. 1, the buffered data may include data for WCD 16, data for WCD 18, data for WCD 20, and data for WCD 22, or the buffered data might be for only a fewer number of these WCDs. The buffered data could include any kind of data that can be transmitted to the WCDs. For example, the data could include real-time data, such as voice data, for a call in involving one or more of the WCDs. Other real-time data could include video data, gaming data, or streaming media content. The data could also include non-real-time data, such as a text message, Web content, or a file that a WCD is downloading. Other types of data are also possible.

The base station may also receive reports on RF conditions from the WCDs being served, as indicated by block 306. The reports could be, for example, CQI reports, as described above. However, a WCD could also report RF conditions at its location in other ways.

As noted above, a base station may evaluate downlink resource allocations periodically, such as at the beginning of every subframe. As part of that evaluation, the base station may identify a downlink resource block as being available for allocation, as indicated by block 308. The downlink resource block could include a plurality of sub-carriers and have a duration that accommodates transmission of multiple OFDM symbols, for example, as shown in FIGS. 2A and 2B and described above.

The base station may then make a determination that the downlink resource block would have sufficient bandwidth to transmit a particular portion of the buffered data, wherein the particular portion of the buffered data is for a particular plurality of WCDs operating in the wireless coverage area, as indicated by block 310. For example, if the base station is buffering for four WCDs (e.g., WCDs 16-22), the base station might determine that the downlink resource block can be used to transmit data for two of the WCDs (e.g., WCDs 20 and 22). It is to be understood, however, that a downlink resource block that can be used to transmit data to two WCDs is only one possible example. In other examples, a base station may determine that a downlink resource block can be used to transmit data to a greater number of WCDs, e.g., three WCDs, four WCDs, or potentially over a hundred WCDs.

To make this determination, the base station may consider the total bandwidth that the downlink resource block would have to transmit data. The total bandwidth could depend on the type of modulation and error-correction coding that is selected for the downlink resource block, which, in turn, could depend on the RF conditions reported by the WCDs (e.g., in block 306). The determination could also depend on the amount of data and the type of data (e.g., real-time or non-real-time) being buffered for each WCD. For example, non-real-time data could be transmitted at nearly any data rate that does not cause the receiving WCD to time out, whereas real-time data could be transmitted using at least a minimum data rate in order to avoid an undesirable level of latency. Thus, a downlink resource block could be shared by any number of WCDs in the case of non-real-time data. For real-time-data, however, the number of WCDs sharing a downlink resource block could be limited by a minimum data rate associated with a desired quality of service level. A typical data rate for voice data that is conveyed in a voice-over-Internet-Protocol (VoIP) format might be on the order of 10 kbits/second. Thus, a downlink resource block with a total bandwidth of 1 Mbits/second could potentially be shared by a hundred WCDs that are receiving voice data.

In response to the determination that the downlink resource block can be shared by a particular plurality of WCDs, the base station may allocate the downlink resource block to that particular plurality of WCDs, as indicated by block 312. For example, with reference to FIG. 1, the base station may buffer data for subsequent transmission to WCDs 16-22, determine that the downlink resource block can be used to transmit data for WCDs 20 and 22, and then allocate the downlink resource block to WCDs 20 and 22.

Method 320 in FIG. 6 is an example of how a downlink resource block that has been allocated to a plurality of WCDs (for example, in accordance with method 300) can be used to transmit data to the WCDs. More particularly, orthogonal codes are used to encode the data in the downlink resource block in a manner that enables each receiving WCD to recover its respective data from the downlink resource block.

In this example, the base station selects a plurality of orthogonal codes for the downlink resource block, as indicated by block 322. The number of orthogonal codes that the base station selects for the downlink resource block may depend on the number of WCDs to which the downlink resource block has been allocated. For example, the number of selected orthogonal codes could be sufficient to allow each WCD to be assigned at least one orthogonal code of its own. Thus, if the downlink resource block is to be shared by n WCDs, then the base station may select at least n orthogonal codes. In this approach, the base station may select at least two orthogonal codes for a resource block that has been allocated to two WCDs, at least four orthogonal codes for a resource block that has been allocated to four WCDs, and so forth.

The base station may select more than n orthogonal codes for n WCDs for various reasons. As one possible reason, the base station may reserve more than one orthogonal code for a WCD, for example, because the WCD has reported poor RF conditions. As another possible reason, the base station may reserve one or more orthogonal codes for multicast data, i.e., data that is intended to be received by more than one WCD.

The base station may then assign each WCD in the plurality of WCDs to which the downlink resource block has been allocated a respective set of one or more orthogonal codes from the selected plurality of orthogonal codes, as indicated by block 324. The assignment may occur such that each orthogonal code in the selected plurality of orthogonal codes is assigned to no more than one WCD in the plurality of WCDs. Thus, each WCD may be assigned its own orthogonal code or codes with which the WCD can use to recover its data from the downlink resource block. However, it is also possible that one or more of the orthogonal codes in the selected plurality could be assigned to more than one WCD. For example, one or more orthogonal codes may be used for multicast data that is received by more than one WCD.

In some embodiments, the base station might assign more than one orthogonal code to a WCD based on the RF conditions reported by that WCD (e.g., as reported by the WCD in one or more CQI reports). For example, if the RF conditions reported by the WCD are good (e.g., the WCD reported a CQI that is above a threshold value), then the base station might assign only one orthogonal code to the WCD. On the other hand, if the RF conditions reported by the WCD are poor (e.g., the WCD reported a CQI that is below a threshold value), the WCD may be assigned more than one orthogonal code. The number of orthogonal codes assigned to the WCD may depend on how poor the RF conditions reported by the WCD are (e.g., how far below the threshold value the WCD's reported CQI is). The multiple orthogonal codes assigned to the WCD may be used to encode multiple instances of the WCD's data in order to improve the WCD's reception of that data.

At block 326, the base station indicates to the plurality of WCDs that the downlink resource block has been allocated to the WCDs and also indicates the one or more orthogonal codes assigned to each WCD. To provide these indications, the base station may transmit one or more communications to the WCDs (e.g., using a PDCCH channel). The one or more communications may occur at the beginning of the subframe in which the downlink resource block occurs. In one example, the base station may transmit a message to a WCD that indicates the allocation of the downlink resource block to the WCD, indicates that the downlink resource block is being shared by multiple WCDs, and indicate the one or more orthogonal codes assigned to the WCD. However, other types of messages are also possible. For example, the base station may indicate the allocation of a downlink resource block to a particular WCD in one message and but indicate the orthogonal codes assigned to the WCD in a separate message.

At block 328, the base station receives a data stream that comprises respective data for each WCD in the particular plurality of WCDs. More particularly, an encoder in the base station may receive the data stream, such as encoder 214 receiving data stream 216 from buffer 210.

At block 330, the base station generates an encoded data stream from the data stream by a process that involves encoding each WCD's respective data in the data stream using a respective orthogonal code assigned to that WCD. For example, encoder 214 may encode each WCD's data in data stream 216 using the WCD's respective orthogonal code to generate encoded data stream 218. If a WCD has been assigned more than one orthogonal code, then the process may also involve generating multiple instances of the WCD's data and encoding each instance with a respective one of the WCD's assigned orthogonal codes.

The base station then generates output symbols from the encoded data stream and transmits the output symbols in the downlink resource block, as indicated by block 332. The output symbols could be OFDM symbols that span the plurality of sub-carriers in the downlink resource block. Thus, the functions of block 332 could be performed by an OFDM transmitter in the base station, such as illustrated in FIG. 4 and described above.

In this approach, the encoded data that is included in the downlink resource block could be a linear combination of the data for the WCDs to which the downlink resource has been allocated, for example, in accordance with equation (2). Thus, the data for different WCDs need not be distinguished on the basis of different resource elements within the downlink resource block. Instead, each resource element and each OFDM symbol can include data for multiple WCDs (e.g., data for a first WCD that is encoded with a first orthogonal code and data for a second WCD that is encoded with a second orthogonal code). In this way, orthogonal codes may be used to share a downlink resource block among multiple WCDs.

4. Example WCD and WCD Functions

Figure 7:
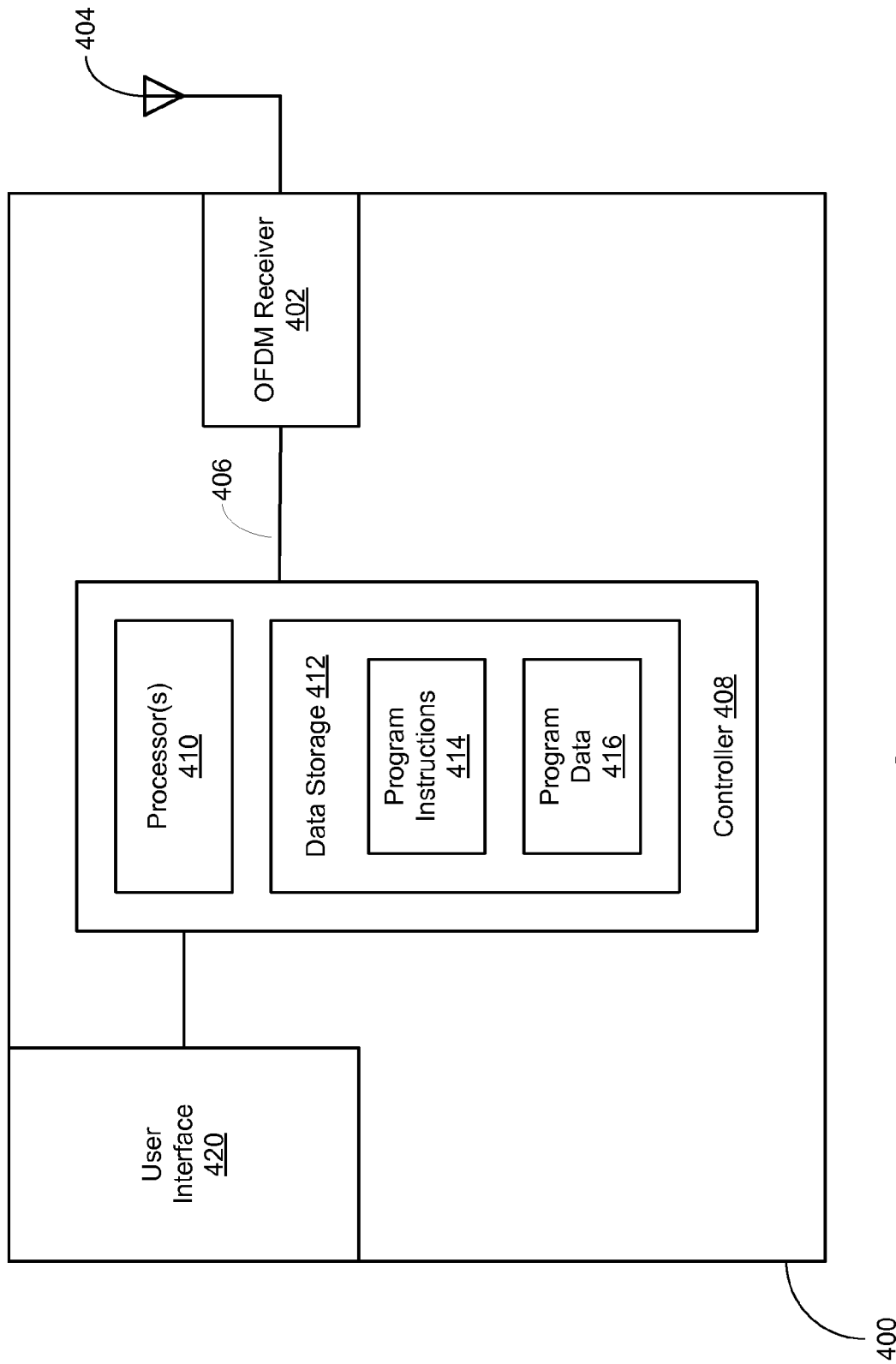
FIG. 7 is a functional block diagram of a WCD, in accordance with an example embodiment.

FIG. 7 is a functional block diagram of an example WCD 400. WCD 400 could, for example, correspond to any of WCDs 16-22 shown in FIG. 1. For purposes of illustration, WCD 400 will be described as using OFDM and downlink resource blocks as shown in FIGS. 2A and 2B. It is to be understood, however, that other types of air interfaces could be used.

As shown in FIG. 7, WCD 400 includes an OFDM receiver 402 for receiving downlink communications from an OFDM communication system, such as base station 200, via one or more antennas, exemplified in FIG. 7 by antenna 404. The downlink communications could include downlink data contained in one or more downlink resource blocks. The downlink communications could also include control signaling, such as messages used to allocate downlink resource blocks to WCD 400 and assign orthogonal codes to WCD 400. WCD 400 could also include an OFDM transmitter (not shown) for transmitting uplink communications via antenna 404.

The OFDM receiver 402 could function to recover data from OFDM symbols, for example, by performing the reverse of the operations performed by OFDM transmitter 202. Thus, OFDM receiver 402 may receive an OFDM symbol spanning N sub-carriers, obtain time-domain samples of the OFDM symbol, and provide the time-domain samples in parallel to a Fast Fourier Transform (FFT) module. The FFT module outputs the N sub-carriers of the OFDM symbol, with each sub-carrier including a respective sub-carrier symbol. OFDM receiver 402 may then demodulate the sub-carriers to recover the data represented by the sub-carrier symbols. The data from the sub-carriers may be serialized to provide an output data stream 406. The output data stream 406 could include data that is encoded with orthogonal codes, for example, in the case that WCD 400 receives a downlink resource block that is shared by multiple WCDs. However, the output data stream 406 could also include data that is not encoded with orthogonal codes, for example, in the case that WCD 400 receives a downlink resource block that is allocated only to WCD 400 and not shared by other WCDs.

WCD 400 may also include a controller 408 that is configured to control the functioning of WCD 400. Controller 408 could be implemented using hardware, software, and or firmware. In one example, controller 408 includes one or more processors 410 and data storage 412. Data storage 412 could be any type of non-transitory computer readable medium, such as volatile and/or non-volatile memory. Data storage 412 may store program instructions 414 and program data 416. Program instructions 414 may be executable by processor(s) 410 to cause WCD 400 to perform operations, such as any of the operations described below with reference to FIG. 8. For example, program instructions 414 may include instructions for receiving an assignment of at least one orthogonal code and to use the at least one orthogonal code to recover data for WCD 400 from encoded data that is included in output data stream 406. Program data 416 could include any data that is generated or used in connection with the execution of any of program instructions 414. For example, program data 416 could include one or more orthogonal codes assigned to WCD 400.

In some examples, program instructions 414 also include an operating system, communications protocols for communicating using LTE or some other type of air interface, and one or more applications that can be accessed by a user of WCD 400. Such applications could include a voice application for VoIP communications, an email application for email communications, a text application for text-based (SMS) communications, a Web application for accessing Web servers, and/or a media application for receiving streaming media from a media server. Other types of applications are also possible.

The data recovered from output data stream 406 could be provided as input to one or more of such applications. Thus, the data recovered from output data stream 406 could include voice data that is provided to a voice application, Web data that is provided to a Web application, streaming media that is provided to a media application, etc.

Some of the applications may be configured to use a user interface 420 in WCD 400. User interface 420 is configured to receive input from the user and to convey output from the user. For instance, user interface 420 may include a touch screen, a keypad, buttons, and or other controls for receiving input from the user. User interface 406 may also include a display screen for displaying textual and/or graphical information to the user. In addition, user interface 406 may include a microphone and speaker for voice communication.

Figure 8:
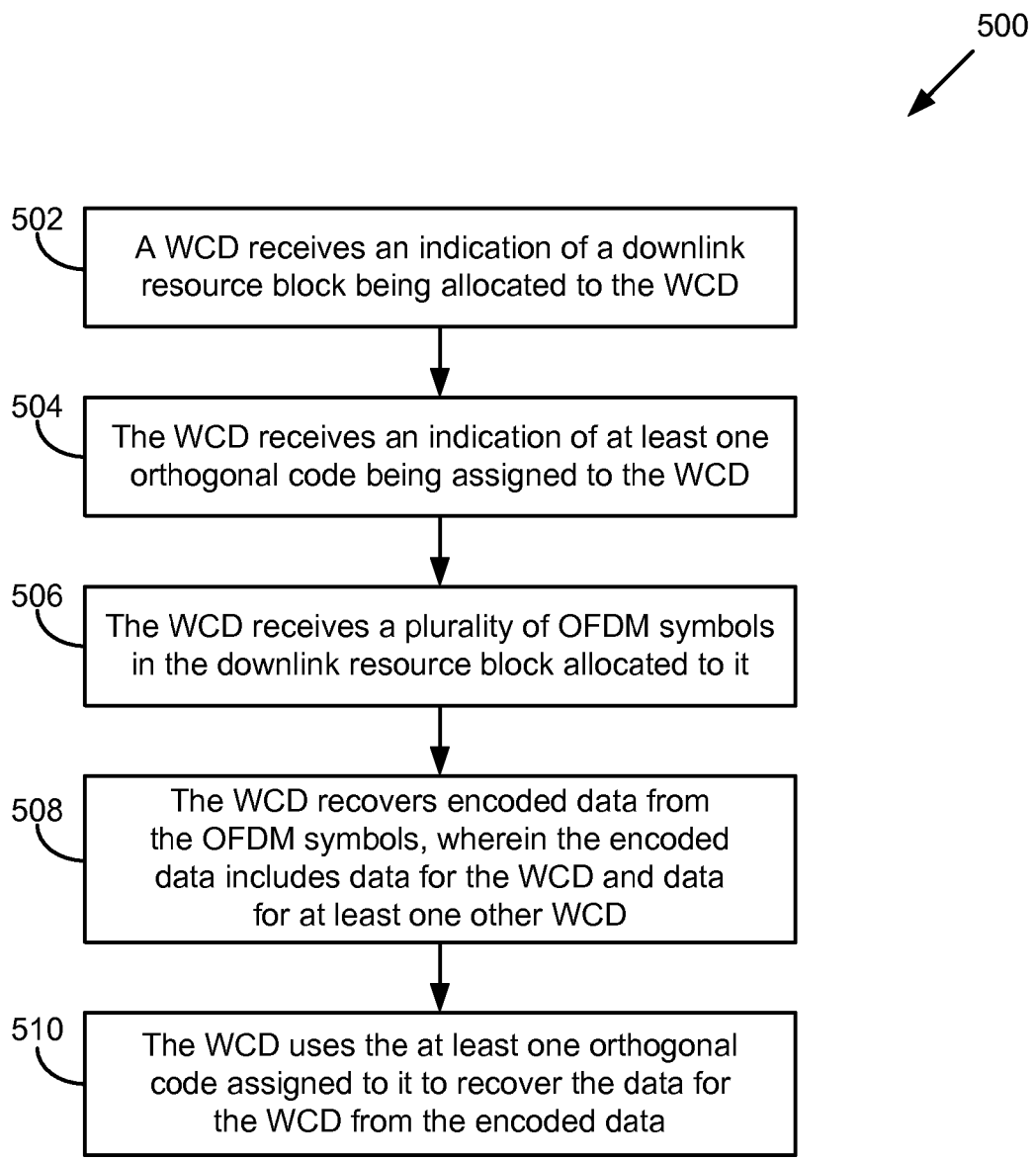
FIG. 8 is a flowchart of a method that may be performed by a WCD, in accordance with an example embodiment.

FIG. 8 is a flowchart illustrating an example method 500 that may be performed by a WCD, such as WCD 400. In method 500, a WCD receives an indication of a downlink resource block being allocated to the WCD, as indicated by block 502. In this example, the downlink resource block that is allocated to the WCD is also allocated to one or more other WCDs and the data in the downlink resource block is encoded with orthogonal codes that enable each WCD to recover its respective data. Thus, the WCD also receives an indication of at least one orthogonal code being assigned to the WCD, as indicated by block 504. The indications of blocks 502 and 504 could be provided as one or more messages transmitted by a base station, for example, in a PDCCH channel.

The WCD receives a plurality of OFDM symbols in the downlink resource block allocated to it, as indicated by block 506. As described above, the downlink resource block can have a predetermined number of sub-carriers (e.g., 12 sub-carriers), and each OFDM symbol in the downlink resource block can span all of these sub-carriers.

The WCD recovers encoded data from the OFDM symbols, wherein the encoded data includes data for the WCD and data for at least one other WCD, as indicated by block 508. The encoded data could be provided in a data stream output from an OFDM receiver in the WCD, such as output data stream 406 in WCD 400. The encoded data could be a linear combination of data for each of the WCDs to which the downlink resource block has been allocated, in which each WCD's data is encoded using a respective orthogonal code. Thus, the encoded data could be a linear combination of the form shown in equation (2) and described above.

The WCD then uses the at least one orthogonal code assigned to it to recover the data for the WCD from the encoded data, as indicated by block 510. The process for recovering the WCD's data may involve the WCD multiplying a portion of the encoded data with an orthogonal code assigned to it, for example, in accordance with equation (3). In the case that the WCD is assigned multiple orthogonal codes, this data recovery process may recover multiple instances of the same data. For example, the WCD may use a first orthogonal code assigned to it to recover a first instance of the data for the WCD, and the WCD may use a second orthogonal code assigned to it to recover a second instance of the data for the WCD.

The recovery of multiple instances of the same data can be advantageous, for example, when the WCD experiences poor RF conditions. In particular, if RF conditions at the WCD are sufficiently poor, some of the data received by the WCD may be errored, for example, as determined by using a cyclic redundancy check (CRC). If the WCD receives errored data, then the WCD could request re-transmission of the data. However, if the WCD receives multiple instances of the data, then the WCD may determine that one instance is errored but another instance is not. In that case, the WCD could use the non-errored data, rather than request re-transmission. Accordingly, when the WCD experiences poor RF conditions, it can be beneficial for the WCD to be assigned multiple orthogonal codes.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
 allocating a downlink resource block to a plurality of wireless communication devices (WCDs), wherein the downlink resource block comprises a plurality of sub-carriers and corresponds to a specified time period, wherein the specified time period has a duration that accommodates transmission of multiple symbols;

selecting a plurality of orthogonal codes for the downlink resource block;

assigning each WCD in the plurality of WCDs a respective set of one or more orthogonal codes from the selected plurality of orthogonal codes;

receiving a data stream that comprises respective data for each of the WCDs;

generating an encoded data stream from the data stream, wherein generating the encoded data stream from the data stream comprises encoding each WCD's respective data in the data stream using a respective orthogonal code assigned to that WCD;

generating output symbols from the encoded data stream; and transmitting, by a transmitter, the output symbols in the downlink resource block.

2. The method of claim 1, wherein the orthogonal codes are Walsh codes.

3. The method of claim 1, wherein the output symbols are orthogonal frequency division multiplexing (OFDM) symbols and each OFDM symbol spans the plurality of sub-carriers.

4. The method of claim 1, wherein each orthogonal code in the selected plurality of orthogonal codes is assigned to no more than one WCD in the plurality of WCDs.

5. The method of claim 1, wherein generating output symbols from the encoded data stream comprises modulating each sub-carrier with a respective portion of the encoded data stream.

6. The method of claim 1, in which at least one output symbol includes encoded data for a first WCD in the plurality of WCDs and encoded data for a second WCD in the plurality of WCDs, wherein the encoded data for the first WCD is encoded using a first orthogonal code assigned to the first WCD and the encoded data for the second WCD is encoded using a second orthogonal code assigned to the second WCD.

7. The method of claim 1, further comprising:
transmitting, by the transmitter, one or more messages to the WCDs, wherein the one or more messages collectively indicate that the downlink resource block has been allocated to the WCDs and indicate the one or more orthogonal codes assigned to each WCD.

8. The method of claim 1, wherein the transmitter defines a wireless coverage area and the WCDs are operating in the wireless coverage area.

9. The method of claim 8, further comprising:
identifying the downlink resource block as being available for allocation;
buffering data for subsequent transmission to multiple WCDs operating in the wireless coverage area;
making a determination that the downlink resource block would have sufficient bandwidth to transmit a particular portion of the buffered data, wherein the particular portion of the buffered data is for a particular subset of the multiple WCDs; and
allocating the downlink resource block to the plurality of WCDs in response to the determination, wherein the plurality of WCDs corresponds to the particular subset of the multiple WCDs.

10. The method of claim 9, wherein the particular portion of the buffered data comprises first voice data for a first WCD and second voice data for a second WCD.

11. The method of claim 1, further comprising:
receiving from a given WCD in the plurality of WCDs a report that indicates radio frequency (RF) conditions at the given WCD; and
assigning a number of orthogonal codes to the given WCD based on the report.

12. The method of claim 11, wherein assigning a number of orthogonal codes to the given WCD comprises:
determining that the report indicates good RF conditions at the given WCD and responsively assigning only one orthogonal code to the given WCD.

13. The method of claim 11, wherein assigning a number of orthogonal codes to the given WCD comprises:
determining that the report indicates poor RF conditions at the given WCD and responsively assigning multiple orthogonal codes to the given WCD.

14. The method of claim 13, wherein generating an encoded data stream from the data stream comprises:
providing multiple instances of the given WCD's data in the data stream; and
encoding each instance of the given WCD's data using a respective orthogonal code in the multiple orthogonal codes assigned to the given WCD.

15. The method of claim 1, wherein selecting a plurality of orthogonal codes for the downlink resource block comprises selecting at least four orthogonal codes for the downlink resource block.

16. A method comprising:
a wireless communication device (WCD) receiving an indication of a downlink resource block being allocated to the WCD, wherein the downlink resource block comprises a plurality of sub-carriers and corresponds to a specified time period;
the WCD receiving an indication of at least one orthogonal code being assigned to the WCD;
the WCD receiving a plurality of OFDM symbols in the downlink resource block;
the WCD recovering encoded data from the OFDM symbols, wherein the encoded data comprises a linear combination of data for the WCD and data for at least one other WCD, in which each WCD's data is encoded using a respective orthogonal code; and
the WCD using the at least one orthogonal code to recover the data for the WCD from the encoded data.

17. The method of claim 16, wherein the WCD using the at least one orthogonal code to recover the data for the WCD from the encoded data comprises:
multiplying a portion of the encoded data with the at least one orthogonal code.

18. The method of claim 16, wherein the at least one orthogonal code comprises at least a first orthogonal code and a second orthogonal code, and wherein the WCD using the at least one orthogonal code to recover the data for the WCD from the encoded data comprises the WCD using the first orthogonal code to recover a first instance of the data for the WCD from the encoded data and using the second orthogonal code to recover a second instance of the data for the WCD from the encoded data.

* * * * *